United States Patent
Ni et al.

(10) Patent No.: US 11,320,914 B1
(45) Date of Patent: May 3, 2022

(54) COMPUTER INTERACTION METHOD, DEVICE, AND PROGRAM PRODUCT

(71) Applicant: EMC IP Holding Company LLC, Hopkinton, MA (US)

(72) Inventors: Jiacheng Ni, Shanghai (CN); Zijia Wang, Shanghai (CN); Qiang Chen, Shanghai (CN); Jinpeng Liu, Shanghai (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/136,794

(22) Filed: Dec. 29, 2020

(30) Foreign Application Priority Data

Nov. 30, 2020 (CN) .......................... 202011380231.1

(51) Int. Cl.
  *G06F 3/01* (2006.01)
  *G06K 9/62* (2022.01)
  *G06V 40/20* (2022.01)

(52) U.S. Cl.
  CPC .......... *G06F 3/017* (2013.01); *G06K 9/6256* (2013.01); *G06V 40/28* (2022.01)

(58) Field of Classification Search
  CPC .. G06F 3/017; G06K 9/6256; G06K 9/00355; G06V 40/28
  See application file for complete search history.

(56) References Cited

U.S. PATENT DOCUMENTS

| | | | | |
|---|---|---|---|---|
| 8,743,052 B1* | 6/2014 | Keller | ..................... | G06F 3/014 345/156 |
| 8,819,812 B1* | 8/2014 | Weber | ..................... | G06F 21/31 726/19 |
| 9,864,433 B2* | 1/2018 | Pinault | ..................... | G06F 3/017 |
| 10,394,333 B2* | 8/2019 | Cheng | ..................... | G01S 7/415 |
| 10,810,418 B1* | 10/2020 | Shaburov | ................ | A63F 13/22 |
| 2010/0064261 A1* | 3/2010 | Andrews | ............. | G06F 3/04883 715/863 |

(Continued)

OTHER PUBLICATIONS

M. H. Zhu et al., "To Prune, or Not to Prune: Exploring the Efficacy of Pruning for Model Compression," arXiv:1710.01878v2, Nov. 13, 2017, 11 pages.

(Continued)

*Primary Examiner* — Grant Sitta
(74) *Attorney, Agent, or Firm* — Ryan, Mason & Lewis, LLP (57) ABSTRACT

Embodiments of the present disclosure provide a computer interaction method, device, and program product. The method includes: acquiring, in response to triggering of an input to an electronic device, multiple images that present a given part of a user; determining a corresponding character sequence based on respective gestures of the given part in the multiple images, corresponding characters in the character sequence being selected from a predefined character set in which multiple characters respectively correspond to different gestures of the given part; and determining, based on the character sequence, a computer instruction to be input to the electronic device. With this solution, the user can conveniently and flexibly execute the input to the electronic device through a gesture of the given part (e.g., a hand).

20 Claims, 8 Drawing Sheets

(56) References Cited

U.S. PATENT DOCUMENTS

| | | | |
|---|---|---|---|
| 2011/0112771 A1* | 5/2011 | French | A63B 24/0062 |
| | | | 702/19 |
| 2012/0319940 A1* | 12/2012 | Bress | G06F 3/017 |
| | | | 345/156 |
| 2013/0108994 A1* | 5/2013 | Srinivasa | G09B 21/009 |
| | | | 434/156 |
| 2013/0204605 A1* | 8/2013 | Lllgner-Fehns | G06F 40/40 |
| | | | 704/2 |
| 2014/0037191 A1* | 2/2014 | Litvak | G06F 3/0425 |
| | | | 382/154 |
| 2014/0247212 A1* | 9/2014 | Kim | G06F 3/011 |
| | | | 345/156 |
| 2014/0254870 A1* | 9/2014 | Tsukamoto | G06K 9/00355 |
| | | | 382/103 |
| 2014/0306877 A1* | 10/2014 | Katz | G06F 3/017 |
| | | | 345/156 |
| 2015/0055821 A1* | 2/2015 | Fotland | G06T 7/246 |
| | | | 382/103 |
| 2015/0199021 A1* | 7/2015 | Jeon | G06F 3/04817 |
| | | | 345/158 |
| 2015/0363001 A1* | 12/2015 | Malzbender | G06F 40/274 |
| | | | 706/18 |
| 2016/0124513 A1* | 5/2016 | Dal Zot | G06K 9/00355 |
| | | | 715/863 |
| 2016/0307469 A1* | 10/2016 | Zhou | G06K 9/6217 |
| 2017/0220120 A1* | 8/2017 | Westbrook | G06F 3/017 |
| 2018/0101520 A1* | 4/2018 | Fuchizaki | G06F 40/30 |
| 2021/0174034 A1* | 6/2021 | Retek | G06F 40/58 |

OTHER PUBLICATIONS

Akash "ASL Alphabet," https://www.kaggle.com/grassknoted/asl-alphabet, Accessed Sep. 28, 2020, 1 page.

D. Rasband, "ASL Alphabet Test," https://www.kaggle.com/danrasband/asl-alphabet-test, Accessed Sep. 28, 2020, 1 page.

* cited by examiner

COMPUTER INTERACTION METHOD, DEVICE, AND PROGRAM PRODUCT

RELATED APPLICATION(S)

The present application claims priority to Chinese Patent Application No. 202011380231.1, filed Nov. 30, 2020, and entitled "Computer Interaction Method, Device, and Program Product," which is incorporated by reference herein in its entirety.

FIELD

Embodiments of the present disclosure relate to the technical field of computers, and in particular to a computer interaction method, device, and computer program product.

BACKGROUND

During use of an electronic device, a user often needs to input interaction instructions to the electronic device. For example, a user may be asked to input verification information during initial access to an electronic device to check if the user is a valid user of the device. During access to the electronic device, the user may need to operate the electronic device by inputting various control commands. Currently, users rely on various input devices, such as touch pads, keyboards, and mice, to perform inputting. These input devices often require the users to perform operations such as manual touching, pressing, or clicking on a virtual or physical keyboard.

However, in some cases, the input devices may be unavailable to the users, or it may be inconvenient for the users to operate the virtual or physical keyboard. This creates obstacles to smooth interaction with the electronic device. Therefore, it is desired to provide a more convenient and versatile means of interaction.

SUMMARY

Embodiments of the present disclosure provide a computer interaction solution.

In a first aspect of the present disclosure, a computer interaction method is provided. The method includes: acquiring, in response to triggering of an input to an electronic device, multiple images that present a given part of a user; determining a corresponding character sequence based on respective gestures of the given part in the multiple images, corresponding characters in the character sequence being selected from a predefined character set in which multiple characters respectively correspond to different gestures of the given part; and determining, based on the character sequence, a computer instruction to be input to the electronic device.

In a second aspect of the present disclosure, an electronic device is provided. The electronic device includes: at least one processor; and at least one memory storing computer-executable instructions, the at least one memory and the computer-executable instructions being configured to cause, together with the at least one processor, the electronic device to perform actions. The actions include: acquiring, in response to triggering of an input to the electronic device, multiple images that present a given part of a user; determining a corresponding character sequence based on respective gestures of the given part in the multiple images, corresponding characters in the character sequence being selected from a predefined character set in which multiple characters respectively correspond to different gestures of the given part; and determining, based on the character sequence, a computer instruction to be input to the electronic device.

In a third aspect of the present disclosure, a computer program product is provided. The computer program product is tangibly stored on a non-volatile computer-readable medium and includes computer-executable instructions, wherein the computer-executable instructions, when executed, cause a device to: acquire, in response to triggering of an input to an electronic device, multiple images that present a given part of a user; determine a corresponding character sequence based on respective gestures of the given part in the multiple images, corresponding characters in the character sequence being selected from a predefined character set in which multiple characters respectively correspond to different gestures of the given part; and determine, based on the character sequence, a computer instruction to be input to the electronic device.

This Summary is provided in order to introduce the selection of concepts in a simplified form, which will be further described in the Detailed Description below. The Summary is not intended to identify key features or primary features of the present disclosure, nor is it intended to limit the scope of the present disclosure.

BRIEF DESCRIPTION OF THE DRAWINGS

The above and other objectives, features, and advantages of the present disclosure will become more apparent by the following description of example embodiments of the present disclosure, to be viewed in conjunction with the accompanying drawings, and in the example embodiments of the present disclosure, the same reference numerals generally represent the same components.

DETAILED DESCRIPTION

The principles of the present disclosure will be described below with reference to several example embodiments shown in the accompanying drawings. Although illustrative embodiments of the present disclosure are shown in the accompanying drawings, it should be understood that these embodiments are described merely to enable those skilled in the art to better understand and then implement the present disclosure, and do not limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another embodiment" means "at least one further embodiment." The terms "first," "second," and the like, may refer to different or the same objects. Other explicit and implicit definitions may also be included below.

As used herein, the term "machine learning" refers to processing involving high-performance computing, machine learning, and artificial intelligence algorithms. Herein, the term "machine learning model" may also be referred to as a "learning model," "learning network," "network model," or "model." A "neural network" or "neural network model" is a deep learning model. To summarize, a machine learning model is capable of receiving input data, performing predictions based on the input data, and outputting prediction results.

A machine learning model may include multiple processing layers, each processing layer having multiple processing units. The processing units are sometimes also referred to as convolution kernels. In a convolution layer of a convolution neural network (CNN), processing units are referred to as convolution kernels or convolution filters. Processing units in each processing layer perform corresponding changes on inputs of that processing layer based on corresponding parameters. An output of the processing layer is provided as an input to the next processing layer. An input to the first processing layer of the machine learning model is a model input to the machine learning model, and an output of the last processing layer is a model output of the machine learning model. Inputs to the intermediate processing layers are sometimes also referred to as features extracted by the machine learning model. Values of all parameters of the processing units of the machine learning model form a set of parameter values of the machine learning model.

Machine learning can mainly be divided into three phases, namely, a training phase, a testing phase, and an application phase (also referred to as an inference phase). During the training phase, a given machine learning model can be trained using a large number of training samples and iterated continuously until the machine learning model can obtain, from the training samples, consistent inferences which are similar to the inferences that human intelligence can make. Through training, the machine learning model may be considered as being capable of learning mapping or association relationships between inputs and outputs from training data. After training, a set of parameter values of the machine learning model is determined. In the testing stage, the trained machine learning model may be tested by using a test sample to determine the performance of the machine learning model. In the application phase, the machine learning model can be used to process, based on the set of parameter values obtained from the training, actual input data to provide corresponding outputs.

As mentioned above, in addition to inputting via a virtual or physical keyboard provided by an input device, a more convenient and versatile means of interaction is needed.

In an example embodiment of the present disclosure, a computer interaction solution is provided. This solution performs computer interaction by constructing a correspondence between multiple gestures of a given part of a user and a predefined character set. In the interaction process, multiple images of the given part of the user are captured, and a character sequence corresponding to multiple gestures of the given part in the multiple images is determined. Multiple character sequences are used to determine a corresponding computer instruction that is to be input to the electronic device.

With this solution, the user can conveniently and flexibly execute the input to the electronic device through a gesture of the given part (e.g., a hand). The input can be captured by means of image or video capturing approaches without operating a physical or virtual keyboard by the user. This is especially useful in cases where a device that does not provide keyboard input is unavailable or where it is inconvenient for a user to operate a keyboard (e.g., blind people, etc.). In addition, performing inputting by means of user gestures can further increase the security of usage of an electronic device, thereby preventing malware from acquiring confidential information (e.g., verification information) by stealing keyboard inputs or by analyzing users' keystroke patterns on a keyboard.

Figure 1:
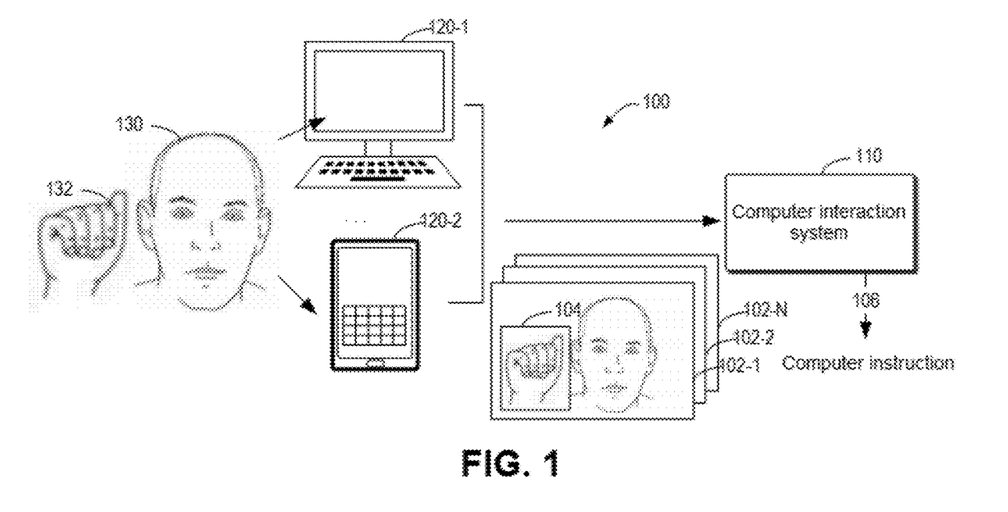
FIG. 1 illustrates a schematic diagram of an environment in which embodiments of the present disclosure can be implemented.

FIG. 1 illustrates a schematic diagram of environment 100 in which the embodiments of the present disclosure can be implemented. In the environment of FIG. 1, user 130 expects to perform inputting to an electronic device, such as electronic device 120-1 or 120-2. The electronic device can be any type of terminal devices or server devices. In the example of FIG. 1, electronic device 120-1 is shown as a desktop computer, and electronic device 120-2 is shown as a mobile phone. Electronic devices 120-1 and 120-2 to which user 130 is to implement inputting may be referred to collectively or individually as electronic device 120.

It should be understood that FIG. 1 only gives some examples regarding electronic device 120 and the way of typing information. Electronic device 120 that supports a user in performing typing may include any type of mobile, fixed, or portable terminals, including a mobile phone, a site, a unit, a device, a multimedia computer, a multimedia tablet, an Internet node, a communicator, a desktop computer, a laptop computer, a notebook computer, a netbook computer, a tablet computer, a personal communication system (PCS) device, a personal navigation device, a personal digital assistant (PDA), an audio/video player, a digital camera/camcorder, a positioning device, a television receiver, a radio broadcast receiver, an e-book device, a gaming device, or any combination of the foregoing, including accessories and peripherals of such devices, or any combination thereof. Electronic device 120 may also include a user-specific interface (such as "wearable" circuitry) capable of supporting any type of terminal.

As shown in FIG. 1, environment 100 includes computer interaction system 110. Computer interaction system 110 is configured to implement interaction between a user and an electronic device. According to an embodiment of the present disclosure, computer interaction system 110 acquires multiple images 102-1, 102-2, . . . , and 102-N (where N is an integer greater than 1) of user 130 for use in determining an expected input of user 130 to electronic device 120. Herein, the input of user 130 to electronic device 120 is regarded as computer instruction 106 that can be used to control electronic device 120 to perform a corresponding operation.

Computer interaction system 110 may include or be implemented as any computing system or server with computing power. In some cases, computer interaction system 110 may be a computing device with limited processing and/or storage resources, for example, a terminal device, such as a mobile phone, a laptop computer, a desktop computer, a tablet computer, an edge computing device for the Internet of Things (IoT), an edge gateway, and the like. Although shown as a discrete system in FIG. 1, computer interaction system 110 may be integrated into electronic devices 120 in some embodiments for use in performing inputting of a computer instruction to this electronic device.

Example embodiments of computer interaction of the present disclosure will be discussed in more detail below with reference to the accompanying drawings.

Figure 2:
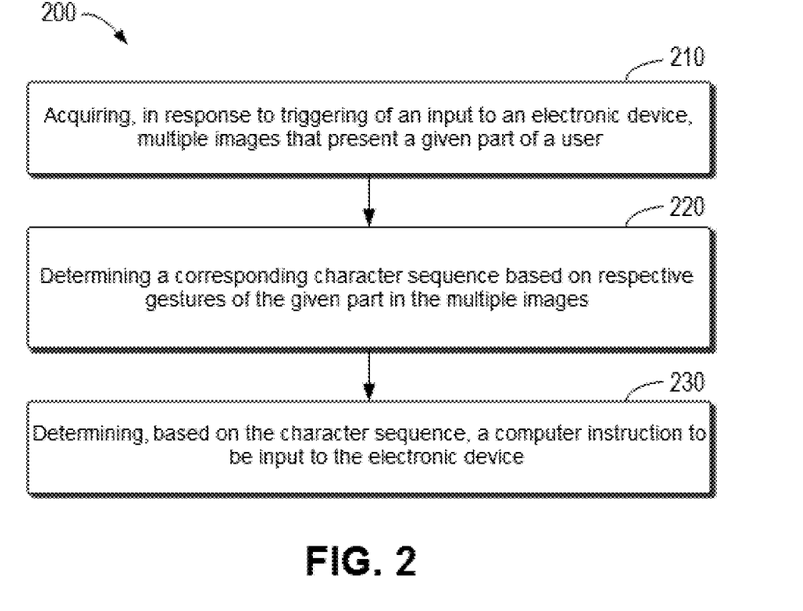
FIG. 2 illustrates a flowchart of a computer interaction process according to some embodiments of the present disclosure.

Referring first to FIG. 2, which illustrates a flowchart of computer interaction process 200 according to some embodiments of the present disclosure. Computer interaction process 200 can be implemented by computer interaction system 110. To facilitate discussion, process 200 will be discussed with reference to FIG. 1.

In block 210 of process 200, computer interaction system 110 acquires multiple images 102-1, 102-2, . . . , and 102-N that present a given part of user 130. To facilitate discussion, images 102-1, 102-2, . . . , and 102-N are sometimes referred to hereinafter collectively or individually as image 102. Multiple images 102 are acquired when the input to electronic device 120 is triggered.

Multiple images 102 can be captured by an image capturing device. The image capturing device may be, for example, any device that is capable of capturing images, such as a camera and a video camera. The image capturing device may be integrated in electronic device 120, or may be external to electronic device 120. The image capturing device may be, for example, triggered to perform image capturing when user 130 is to perform an input to the electronic device. In some embodiments, user 130 may be located near electronic device 120 when performing inputting. In some embodiments, multiple images 102 may be, for example, multiple static images that are discretely collected. In some embodiments, a dynamic image, such as a video, can be captured, and multiple images 102 can be extracted therefrom.

As briefly described above, in the embodiments of the present disclosure, the input to electronic device 120 is controlled by a gesture of the given part of the user. Therefore, multiple images 102 are to present the given part of user 130. In some embodiments, the given part may be a hand of user 130, including one hand or both hands. A hand can usually be controlled more flexibly to perform more gestures, so it is suitable for implementing more versatile inputting in interaction. In the example of FIG. 1, the given part includes hand 132 of user 130.

In some embodiments, the given part may also include the hand and other parts (e.g., the face, a shoulder, etc.) of user 130. In other embodiments, the part of which the gesture is used to implement inputting may also include any other part of user 130, which, for example, may be the whole body of user 130.

In block 220, computer interaction system 110 determines a corresponding character sequence based on respective gestures of the given part in the multiple images 102. According to an embodiment of the present disclosure, a predefined character set is established, in which each character respectively corresponds to a different gesture of the given part. Thus, by detecting the respective gestures of the given part from the multiple images 102, the character corresponding to the gesture of the given part in each image 102 can be determined.

In some embodiments, the predefined character set may include a sign language character set. The sign language character set includes multiple natural language characters defined by one sign language, and each natural language character corresponds to a gesture of a hand. Sign language is a natural language resulting from the communication needs of deaf people. Sign language, also referred to as hand gesture language, mainly represents corresponding characters through changes in gestures of the hand (referred to as "hand gesture"), including finger pattern changes, movements of the fingers, and so on. Through hand gestures that change in sequence, the purpose of spelling out words and sentences in sequence can be achieved. Since sign language can achieve visual communication, it is suitable for use in computer interaction based on visual gestures.

Figure 3A:
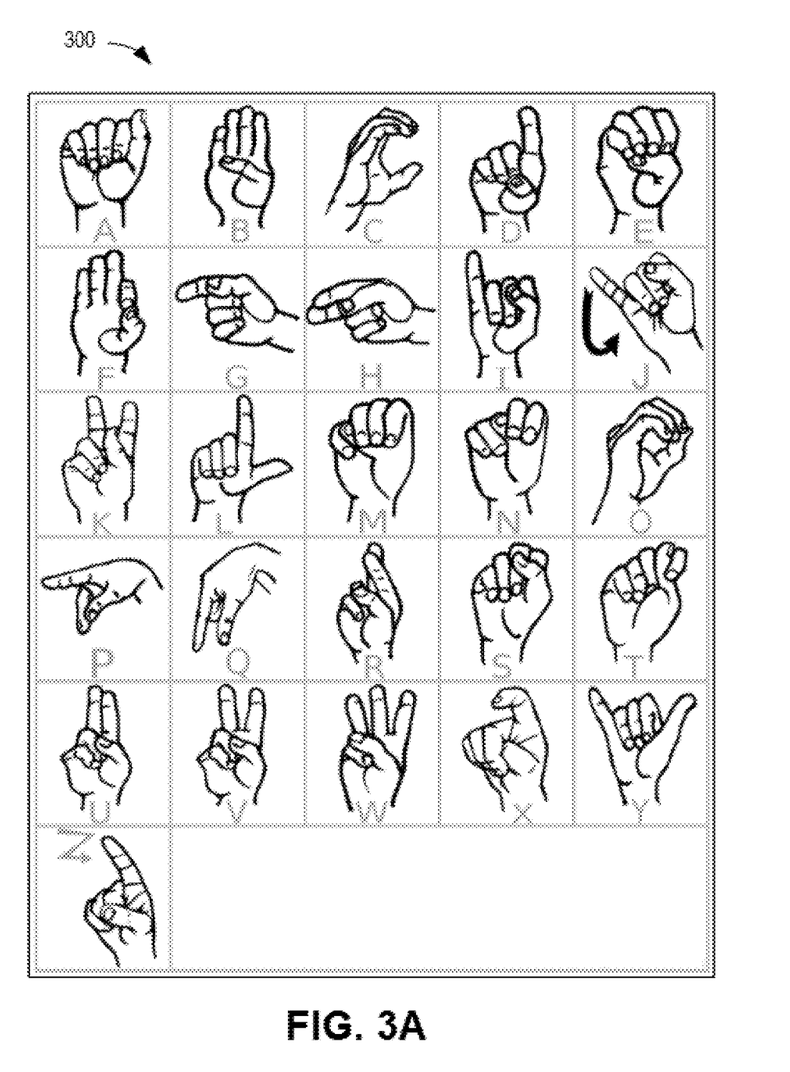
FIGS. 3A to 3C illustrate examples of gestures of predefined characters according to some embodiments of the present disclosure.
Figure 3B:
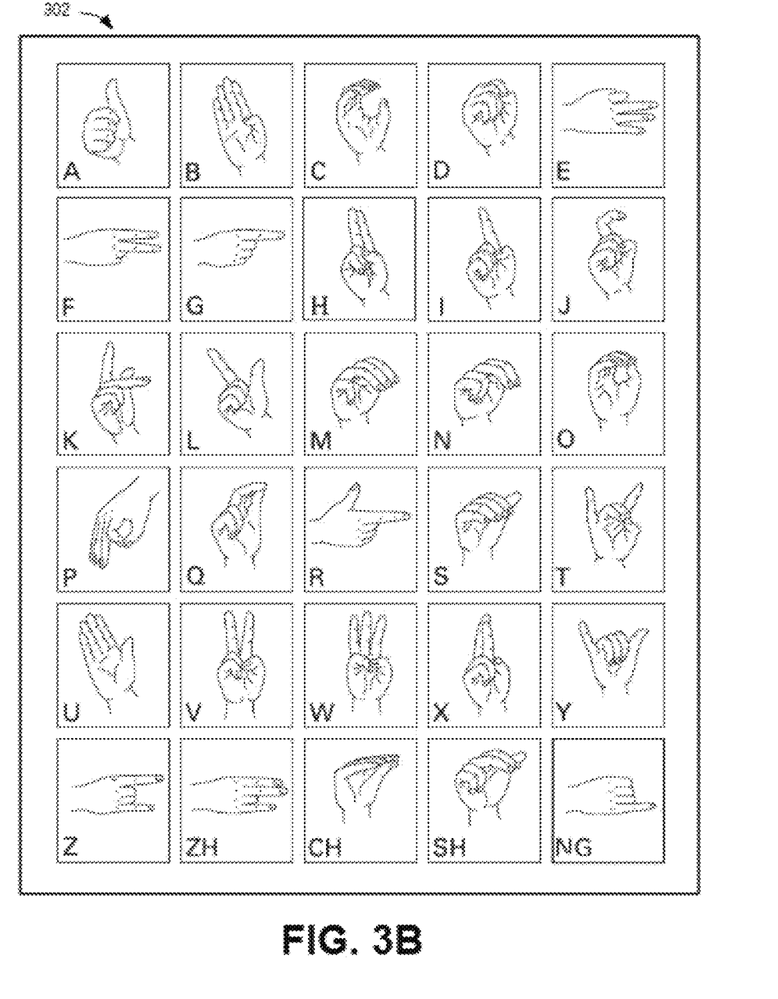

There are already some sign languages commonly used in corresponding countries or regions in the world. For example, American Sign Language (ASL) is a sign language common in the English language environment that consists of 26 hand gestures respectively corresponding to the 26 English letters. FIG. 3A illustrates example 300 of the 26 hand gestures of ASL, which respectively correspond to the 26 English letters A through Z. In ASL, for the English letter corresponding to each hand gesture, upper and lower case forms make no difference. In countries or regions where Chinese is used, there is also Chinese sign language, wherein each hand gesture corresponds to a phonetic character in the Chinese phonetic alphabet. FIG. 3B illustrates example 302 of 30 hand gestures of the Chinese finger phonetic characters, which respectively correspond to the 26 phonetic letters A through Z, and the phonetic combinations ZH, CH, SH, and NG.

In some embodiments, in addition to ASL and Chinese finger phonetic characters, other sign languages, such as British, Australian, and New Zealand Sign Language (BANZSL), French Sign Language, Japanese Sign Language (JSL), Arabic Sign Language, Spanish Sign Language, Mexican Sign Language, etc., may be utilized. Different sign languages define different hand gestures that are used to indicate different characters in the corresponding natural language. In some embodiments, the predefined character set used in the embodiments of the present disclosure may be derived from characters from a variety of sign languages, as long as these characters correspond to different hand gestures.

In some embodiments, since it is desired to control an input to an electronic device using a gesture of the hand, in addition to utilizing multiple characters in sign language, other gestures related to the given part may also be used to input one or more special symbols. The gestures used to indicate special symbols may be different from the gestures in sign language. For example, they can be indicated by gestures of other parts, or indicated by different gestures of the hand.

Figure 3C:
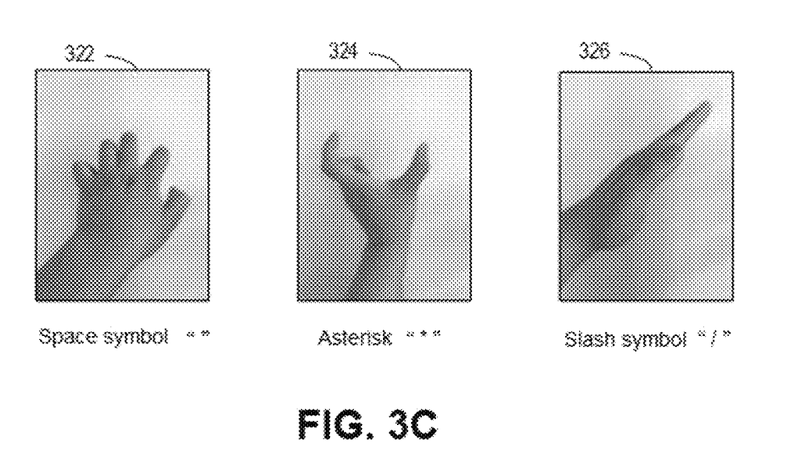

In some embodiments, taking into account common symbols in computer instructions, one or more special symbols that need to be designed may include the space symbol (" "), the asterisk ("*"), the slash symbol ("/"), and so on. FIG. 3C illustrates three example hand gestures 322, 324, and 326 respectively corresponding to the special symbols, i.e., the space symbol (" "), the asterisk symbol ("*"), and the slash symbol ("/"). It should be understood that other hand gestures or gestures of other parts can also be used to indicate these special symbols.

In some embodiments, computer interaction system 110 may identify, from each image 102, image region 104 that presents the given part, and determine the gesture of the given part in image region 104. Computer interaction system 110 may determine the character corresponding to each recognized gesture based on a correspondence between corresponding characters in the predefined character set and the respective gestures of the given part, for example, the correspondence between hand gestures and characters indicated in FIGS. 3A to 3C. The characters recognized from multiple images 102 constitute a character sequence.

In some embodiments, in order to more accurately recognize the gesture of the given part presented in image 102 so as to determine the character sequence, computer interaction system 110 may perform gesture recognition and character sequence determination using a machine learning model, in particular a deep learning model. This will be described in more detail hereinafter.

In block 230, computer interaction system 110 determines, based on the character sequence, computer instruction 106 to be input to the electronic device. Through gesture recognition, gestures of the given part of user 130 are converted into a character sequence which can correspond to a text-based computer instruction for controlling electronic device 120. Such computer instruction 106 may correspond to different instructions in different applications that need user input. Electronic device 120 will execute input computer instruction 106.

In some embodiments, user 130 may be performing inputting for user verification. Through the gestures of the given part, user 130 may input in a verification box of electronic device 120 the verification information required for user verification, such as a user name and/or a password. The user name and the password may include, for example, multiple characters. Therefore, by recognizing the character sequence corresponding to the gestures of the given part of the user, the corresponding user name and/or password can be input into the verification box. Electronic device 120 can verify whether user 130 is a valid user.

In some embodiments, user 130 may be performing inputting related to a computer-executable command. User 130 can input a text instruction corresponding to the computer-executable command in a command input box of electronic device 120 through the gestures of the given part to control the operation of electronic device 120, such as opening a file and returning to the homepage. These computer-executable commands are also indicated by corresponding text sequences.

The computer-executable instructions may also include inputs under any other application, and the embodiments of the present disclosure are not limited in this respect.

Figure 4:
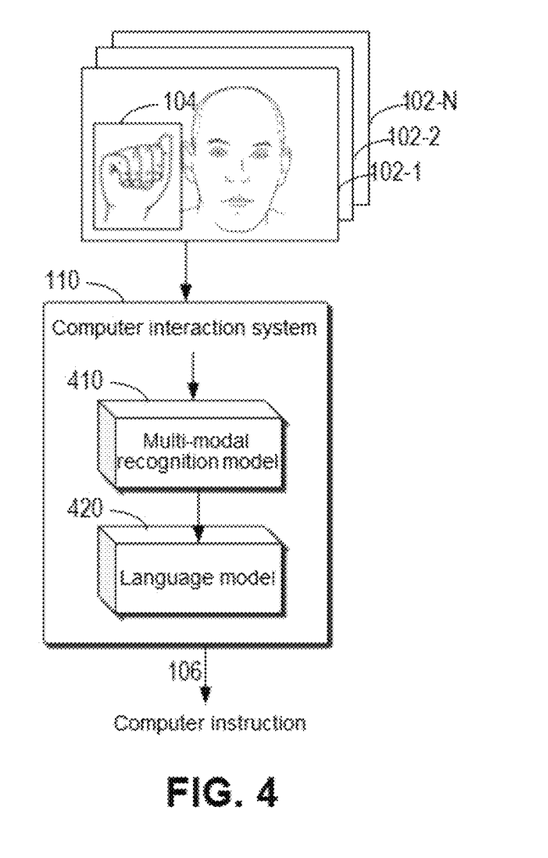
FIG. 4 illustrates a block diagram of a computer interaction system according to some embodiments of the present disclosure.

FIG. 4 illustrates an example structure of computer interaction system 110 according to some embodiments. As shown in FIG. 4, computer interaction system 110 includes trained multi-modal recognition model 410 that is used to recognize gestures of a given part (e.g., a hand) presented in multiple images 102. The gestures recognized by multi-modal recognition model 410 respectively correspond to characters in a predefined character set. Therefore, a character sequence corresponding to the gestures in the multiple images can be determined based on a correspondence between corresponding characters in the predefined character set and the respective gestures of the given part.

Multi-modal recognition model 410 may be trained to be capable of distinguishing various states of the given part, thereby achieving recognition of characters in the predefined character set that correspond to multiple gestures. Each gesture can be considered as a modal. In some embodiments, multi-modal recognition model 410 may be configured as a deep neural network (DNN) model. Multi-modal recognition model 410 may be selected as a DNN model suitable for visual recognition processing, for example, a model based on a convolution neural network (CNN). Multi-modal recognition model 410 may be implemented using various DNN model configurations available or to be developed in the future.

In some embodiments, considering that computer interaction system 110 may be implemented in a device with limited resources, for example, in electronic device 120 itself, multi-modal recognition model 410 may be selected as a model suitable for on-device or embedded applications so as to obtain more accurate recognition results on the basis of limited computing, power, and storage space. For example, multi-modal recognition model 410 may be a MobileNet model and various variants thereof. The MobileNet model is a lightweight model that has the characteristics of small size, low latency, and low power consumption to meet the needs of resource-constrained applications. Multi-modal recognition model 410 may be a MobileNet model used to implement gesture classification and recognition.

Figure 5:
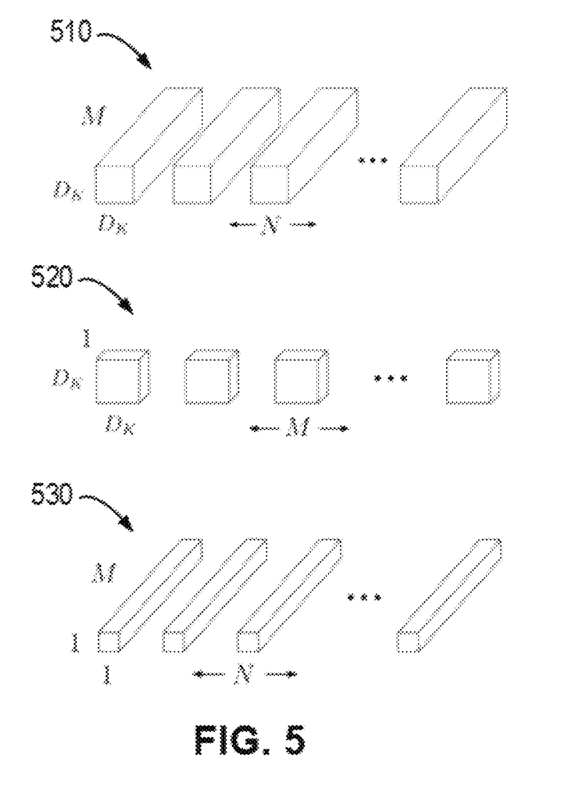
FIG. 5 illustrates example structures of different convolution filters according to some embodiments of the present disclosure.

FIG. 5 illustrates convolution filters of different CNN model structures. Convolution filter 510 is a conventional standard convolution filter, and each CNN model may include N such convolution filters, each filter having a dimension of $D_K*M*D_K$, where M and $D_K$ are integers greater than 1. Convolution filter 520 is a filter based on Depthwise Separable Convolution and with a dimension of $D_K*1*D_K$. Convolution filter 520 can implement decomposition convolution, which splits the standard convolution operation into a depthwise convolution and multiple pointwise convolutions, thereby achieving a trade-off between latency and accuracy. Convolution filter 530 is filter 1*M*1 that implements pointwise convolution in convolution filter 520. In some embodiments, multi-modal recognition model 410 may include a CNN model based on convolution filter 520.

In some embodiments, in order to further reduce the complexity of the model while maintaining the accuracy, multi-modal recognition model 410 is compressed in a training process by means of model pruning or parameter quantization. Generally, large-size models have more network layers and nodes, which increases the storage space and computing resource requirements of the model. This problem can be solved by model compression so as to apply the model to electronic devices with limited resources, for example, IoT devices such as mobile phones. Model compression can be achieved by means of model pruning or parameter quantization.

Figure 6:
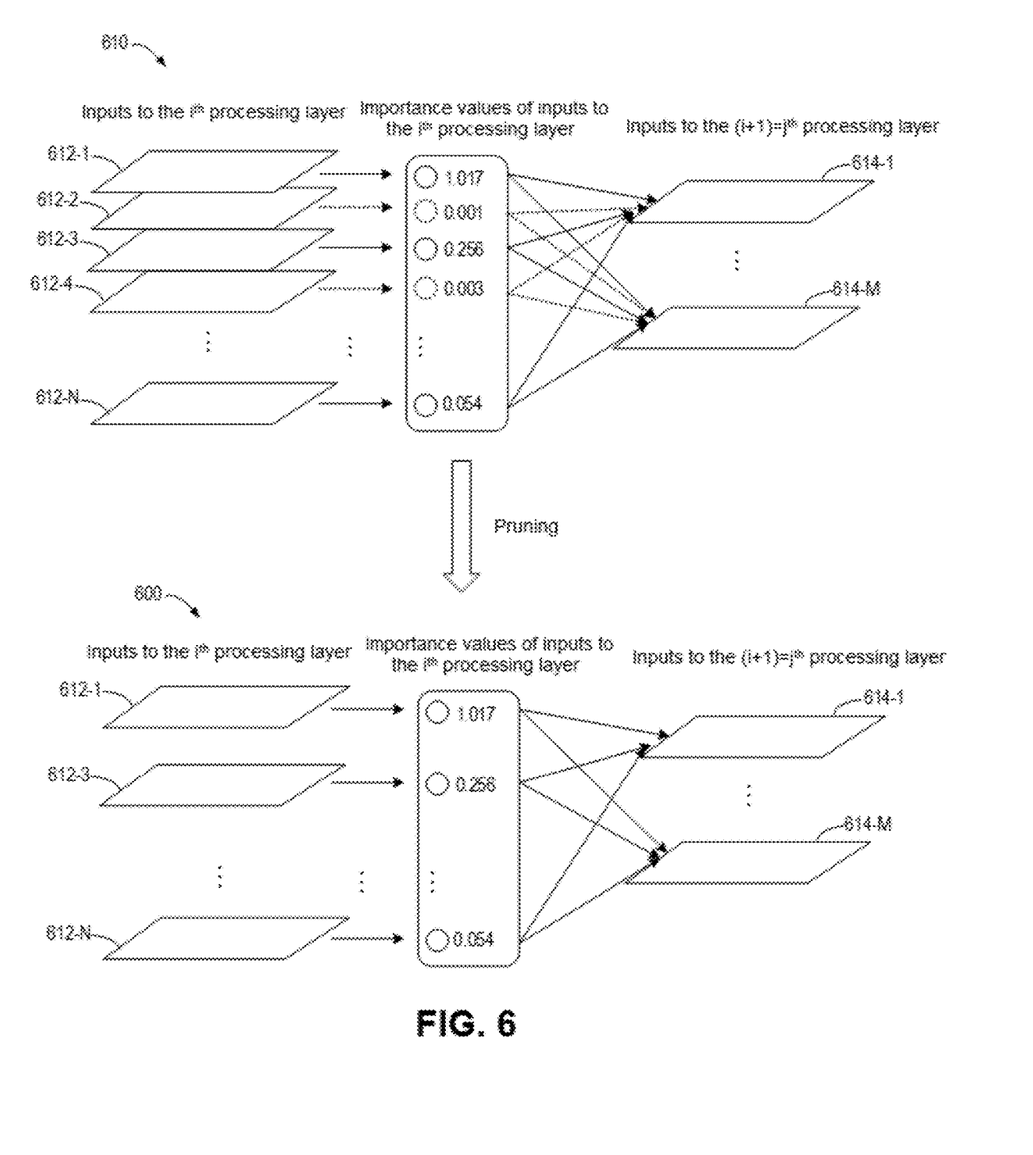
FIG. 6 illustrates an example of model compression according to some embodiments of the present disclosure.

Model pruning refers to removal of redundant network layer connections from a model structure, so that less important model parameters can be deleted. FIG. 6 illustrates a pruning process for certain processing layer 610 of multi-modal recognition model 410 based on model pruning.

As shown in FIG. 6, processing layer 610 needs to process N inputs 612-1 to 612-N (collectively or individually referred to as input 612). Input 612 can be any data or information to be processed. Processing layer 610 has processing units that are used to process corresponding inputs 612 so as to obtain corresponding M outputs 614-1 to 614-M (collectively or individually referred to as output 614). N and M can be positive integers greater than or equal to 1. Each input 614 is associated with one or more inputs 612. Associated input 612 is used to determine corresponding output 614 during model processing. An association between input 612 and output 614 depends on a model configuration. FIG. 6 illustrates a full connection example, where one output 614 is associated with all inputs 612. In other examples, one output 614 may be associated with one or some inputs 612.

FIG. 6 also illustrates an importance value corresponding to each input 612. Generally, the greater the importance value of input 612 is, the more important the input 612 is, and in some cases, input 612 may contribute more to output 614 of the processing layer. Among the determined importance values, there are some relatively small importance values, so the importance of inputs 612 corresponding to these importance values is relatively low. FIG. 6 only shows one processing layer 610 of multi-modal recognition model 410. Multi-modal recognition model 410 may include multiple similar processing layers.

As shown in FIG. 6, after model pruning, inputs corresponding to relatively small importance values (that is, importance values smaller than a target importance value) can be deleted from processing layer 610. In this way, pruned processing layer 600 can be obtained, representing a compressed processing layer. Since the inputs of the processing layer are deleted, in pruned processing layer 600, the corresponding inputs do not need to be processed. For example, inputs 612-2 and 612-4 do not need to be processed. Similar pruning can be performed for each processing layer of multi-modal recognition model 410.

In model compression, parameter quantization refers to merging of some parameters through parameter clustering or rounding operations, so that the same or similar connections between network layers can be represented by a smaller number of parameters, thus saving storage space. In parameter quantization, parameter clustering or rounding can be implemented by using fewer floating point values to represent more features. Another way is to convert, by means of rounding, the parameter values represented by floating point values to parameter values represented by fixed point values, which can save storage space.

During the training phase, training data of multi-modal recognition model 410 may include multiple training images. For the hand gesture corresponding to each character in the predefined character set, one or more training images may be provided to enable multi-modal recognition model 410 to learn how to recognize this hand gesture. The multiple training images may be labeled with the corresponding gesture which is indicated, for example, by a hand gesture. Various known training algorithms can be used to train multi-modal recognition model 410, and the embodiments of the present disclosure are not limited in this respect.

In some embodiments, in order to further improve the accuracy of the character sequence, further correction may also be performed on the basis of the result of recognition of the multi-modal recognition model. As shown in FIG. 4, computer interaction system 110 may also include language model 420 which is configured to correct the character sequence recognized by multi-modal recognition model 410. Computer interaction system 110 may then determine a computer instruction corresponding to the corrected character sequence.

Language model 420 is configured as a model that is used to determine a probability distribution of the character sequence so as to verify the rationality or accuracy of the character sequence in a specific language. Given a character sequence (e.g., a character sequence with a length of m character units), language model 420 can determine the probability $P(w_1, \ldots w_m)$ of the entire character sequence.

Language model 420 can calculate the Bayesian probability of the character sequence. According to the Markov hypothesis, that is, each character in the character sequence is affected by the previous character, $P(w_1, \ldots w_m)$ can be calculated in the following Formula (1):

$$P(w_1, \ldots w_m) = P(w_1) * P(w_1|w_2) * P(w_3|w_1 w_2) \ldots *$$
$$P(w_m|w_1 \ldots w_{m-1}) \qquad \text{Formula (1)}$$

Language model 420 calculates, by relying on a corpus, the probability of each sequence $w_1, \ldots w_m$, that is, whether it is a rational representation in a corresponding language.

For example, assuming that the character sequence recognized from multiple images 102 is "cd/homi," which can be divided into a sequence of [cd, space, slash, homi], where space represents a space (" "), and slash represents a slash symbol ("/"). Language model 420 can calculate the probability of this sequence as follows:

$$P(\text{cd,space,slash,homi}) = P(\text{cd}) * P(\text{space}|\text{cd}) *$$
$$P(\text{slash}|\text{space}) * P(\text{homi}|\text{slash}) \qquad \text{Formula (2)}$$

In this example, it can be determined through probability calculation that the probability P(homi|slash) is a small value. This means that if the previous character is a slash symbol, the probability that "homi" appears afterwards in the character sequence is small, so "homi" may be an incorrect representation. In some embodiments, it is also possible to continue to correct an incorrect representation in the recognized character sequence. For example, it is possible to determine candidate words with an edit distance of one or two characters from "homi." For example, a candidate word with one edit distance from "homi" refers to a candidate word generated by replacing one character in "homi" with another character. For example, "home" is a candidate word with one edit distance from "homi," where a character "i" in "homi" is replaced with "e." Candidate words corresponding to other edit distances can also be similarly generated. In some embodiments, candidate words with more edit distances (for example, edit distances of three and/or four characters) can also be constructed.

Then, language model 420 is used to calculate the probability P(c|slash) of multiple candidate words and slash symbols, where c represents a candidate word. The candidate word corresponding to the maximum probability can be selected, namely, $\text{argmax}_c P(c|\text{slash})$, it can be regarded as a corrected word. In this way, the corrected character sequence can be determined.

Generally, language model 420 has low complexity and size, and may also be embedded in an electronic device with limited resources.

Figure 7:
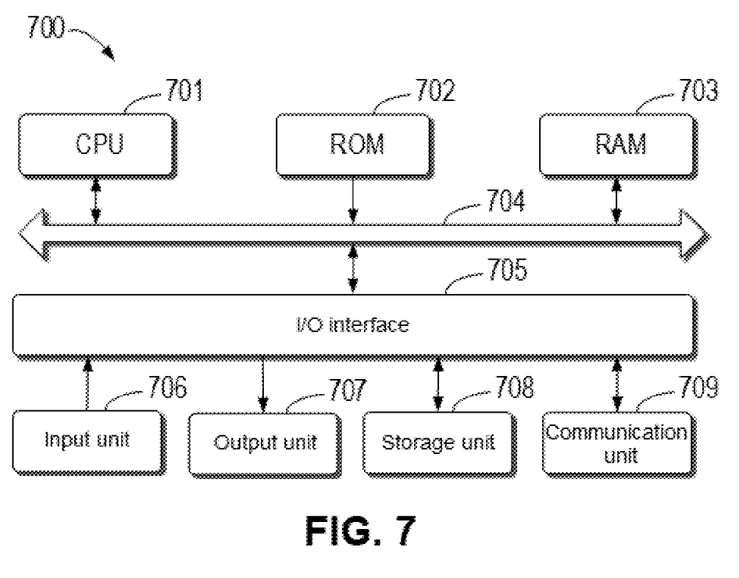
FIG. 7 illustrates a block diagram of an example device that can be used to implement the embodiments of the present disclosure.

FIG. 7 illustrates a schematic block diagram of example device 700 that can be used to implement the embodiments of the present disclosure. Device 700 may be used to implement process 200 of FIG. 2. Device 700 may be implemented as or included in computer interaction system 110 illustrated in FIG. 1.

As shown in the figure, device 700 includes a processing unit, illustratively central processing unit (CPU) 701, that may perform various appropriate actions and processing according to computer-executable instructions stored in read-only memory (ROM) 702 or computer-executable instructions loaded from storage unit 708 into random access memory (RAM) 703. In RAM 703, various programs and data required for the operation of storage device 700 may also be stored. CPU 701, ROM 702, and RAM 703 are connected to each other through bus 704. Input/output (I/O) interface 705 is also connected to bus 704.

Multiple components in device 700 are connected to I/O interface 705, including: input unit 706, such as a keyboard and a mouse; output unit 707, such as various types of displays and speakers; storage unit 708, such as a magnetic disk and an optical disk; and communication unit 709, such as a network card, a modem, and a wireless communication transceiver. Communication unit 709 allows device 700 to exchange information/data with other devices via a computer network such as the Internet and/or various telecommunication networks.

CPU 701 performs the various methods and processing described above, such as process 200. For example, in some embodiments, process 200 may be implemented as a computer software program or a computer program product that is tangibly contained in a machine-readable medium, such as a non-transitory computer-readable medium, for example, storage unit 708. In some embodiments, part or all of the computer program may be loaded and/or installed onto device 700 via ROM 702 and/or communication unit 709. When the computer program is loaded onto RAM 703 and executed by CPU 701, one or more steps of process 200 described above may be performed. Alternatively, in other embodiments, CPU 701 may be configured in any other suitable manners (for example, by means of firmware) to perform process 200.

Those skilled in the art should understand that the steps of the above method of the present disclosure may be implemented by a universal computing apparatus, and may be centralized on a single computing apparatus or distributed over a network composed of a plurality of computing apparatuses. Optionally, they may be implemented using program code executable by a computing apparatus, so that they may be stored in a storage apparatus and executed by a computing apparatus, or they may be made into integrated circuit modules respectively, or they may be implemented by making a plurality of modules or steps thereof into a single integrated circuit module. Thus, the present disclosure is not limited to any particular combination of hardware and software.

It should be understood that although some apparatuses or sub-apparatuses of the device are mentioned in the above detailed description, such division is merely illustrative rather than mandatory. In fact, the features and functions of two or more apparatuses described above may be embodied in one apparatus according to the embodiments of the present disclosure. On the contrary, the features and functions of one apparatus described above can be embodied by further dividing the apparatus into multiple apparatuses.

The foregoing are merely optional embodiments of the present disclosure and are not intended to limit the present disclosure, and for those skilled in the art, the present disclosure is subject to various changes and variations. Any modifications, equivalent replacements, improvements, etc., made within the spirit and principles of the present disclosure shall be included in the scope of protection of this disclosure.

What is claimed is:

1. A computer interaction method, including:
   acquiring, in response to triggering of an input to an electronic device, multiple images that present a given part of a user, the multiple images comprising a first image and a second image, the first image being associated with a first character based on a first gesture of the given part in the multiple images, and the second image being associated with a second character based on a second gesture of the given part in the multiple images;
   determining a corresponding character sequence based on at least the first character and the second character associated with the first and second images in the multiple images, the first and second characters in the character sequence being selected from a predefined character set in which multiple characters respectively correspond to different gestures of the given part; and
   determining, based on the character sequence of at least the first and second characters, a computer instruction to be input to the electronic device;
   wherein determining the computer instruction includes:
   correcting the character sequence of at least the first and second characters using a trained language model; and
   determining a computer instruction corresponding to the corrected character sequences;
   wherein the predefined character set includes:
   multiple natural language characters respectively corresponding to multiple gestures of the given part; and
   at least one special symbol; and
   wherein at least one gesture corresponding to the at least one special symbol is different from any of the multiple gestures respectively corresponding to the multiple natural language characters.

2. The method according to claim 1, wherein determining the character sequence includes:
   recognizing the respective gestures of the given part in the multiple images using a trained multi-modal recognition model; and
   determining the character sequence corresponding to the recognized respective gestures based on a correspondence between corresponding characters in the predefined character set and the respective gestures of the given part.

3. The method according to claim 2, wherein the multi-modal recognition model is compressed in a training process by means of model pruning or parameter quantization.

4. The method according to claim 1, wherein the predefined character set includes at least a sign language character set which includes at least a portion of the multiple natural language characters respectively corresponding to multiple gestures of a hand.

5. The method according to claim 1, wherein the gestures corresponding to the at least one special symbol being are different from any of the multiple gestures respectively corresponding to the multiple natural language characters.

6. The method according to claim 5, wherein the at least one special symbol includes at least one of a space symbol, an asterisk, and a slash symbol.

7. The method according to claim 4, wherein the sign language character set includes multiple English letters in American Sign Language (ASL) or multiple phonetic characters in Chinese Sign Language.

8. The method according to claim 1, wherein the computer instruction includes at least one of an input related to user verification and an input of a computer-executable command.

9. An electronic device, including:
   at least one processor; and
   at least one memory storing computer-executable instructions, the at least one memory and the computer-executable instructions being configured to cause, together with the at least one processor, the electronic device to perform actions including:
   acquiring, in response to triggering of an input to the electronic device, multiple images that present a given part of a user, the multiple images comprising a first image and a second image, the first image being associated with a first character based on a first gesture of the given part in the multiple images, and the second image being associated with a second character based on a second gesture of the given part in the multiple images;
   determining a corresponding character sequence based on at least the first character and the second character associated with the first and second images in the multiple images, the first and second characters in the character sequence being selected from a predefined character set in which multiple characters respectively correspond to different gestures of the given part; and determining, based on the character sequence of at least the first and second characters, a computer instruction to be input to the electronic device;

wherein determining the computer instruction includes:

correcting the character sequence of at least the first and second characters using a trained language model; and determining a computer instruction corresponding to the corrected character sequences;

wherein the predefined character set includes:

multiple natural language characters respectively corresponding to multiple gestures of the given part; and at least one special symbol; and wherein at least one gesture corresponding to the at least one special symbol is different from any of the multiple gestures respectively corresponding to the multiple natural language characters.

10. The device according to claim 9, wherein determining the character sequence includes:

recognizing the respective gestures of the given part in the multiple images using a trained multi-modal recognition model; and determining the character sequence corresponding to the recognized respective gestures based on a correspondence between corresponding characters in the predefined character set and the respective gestures of the given part.

11. The device according to claim 10, wherein the multi-modal recognition model is compressed in a training process by means of model pruning or parameter quantization.

12. The device according to claim 9, wherein the predefined character set includes at least a sign language character set which includes at least a portion of the multiple natural language characters respectively corresponding to multiple gestures of a hand.

13. The device according to claim 9, wherein the gestures corresponding to the at least one special symbol are different from any of the multiple gestures respectively corresponding to the multiple natural language characters.

14. The device according to claim 13, wherein the at least one special symbol includes at least one of a space symbol, an asterisk, and a slash symbol.

15. The device according to claim 12, wherein the sign language character set includes multiple English letters in American Sign Language (ASL) or multiple phonetic characters in Chinese Sign Language.

16. The device according to claim 9, wherein the computer instruction includes at least one of an input related to user verification and an input of a computer-executable command.

17. A computer program product that is tangibly stored on a non-volatile computer-readable medium and includes computer-executable instructions, wherein the computer-executable instructions, when executed, cause a device to:

acquire, in response to triggering of an input to an electronic device, multiple images that present a given part of a user, the multiple images comprising a first image and a second image, the first image being associated with a first character based on a first gesture of the given part in the multiple images, and the second image being associated with a second character based on a second gesture of the given part in the multiple images;

determine a corresponding character sequence based on at least the first character and the second character associated with the first and second images in the multiple images, the first and second characters in the character sequence being selected from a predefined character set in which multiple characters respectively correspond to different gestures of the given part; and determine, based on the character sequence of at least the first and second characters, a computer instruction to be input to the electronic device;

wherein determining the computer instruction includes:

correcting the character sequence of at least the first and second characters using a trained language model; and determining a computer instruction corresponding to the corrected character sequences;

wherein the predefined character set includes:

multiple natural language characters respectively corresponding to multiple gestures of the given part; and at least one special symbol; and wherein at least one gesture corresponding to the at least one special symbol is different from any of the multiple gestures respectively corresponding to the multiple natural language characters.

18. The computer program product according to claim 17, wherein determining the character sequence includes:

recognizing the respective gestures of the given part in the multiple images using a trained multi-modal recognition model; and determining the character sequence corresponding to the recognized respective gestures based on a correspondence between corresponding characters in the predefined character set and the respective gestures of the given part.

19. The computer program product according to claim 17, wherein the predefined character set includes at least a sign language character set which includes at least a portion of the multiple natural language characters respectively corresponding to multiple gestures of a hand.

20. The computer program product according to claim 17, wherein the gestures corresponding to the at least one special symbol are different from any of the multiple gestures respectively corresponding to the multiple natural language characters.

* * * * *

UNITED STATES PATENT AND TRADEMARK OFFICE
CERTIFICATE OF CORRECTION

| | | |
|---|---|---|
| PATENT NO. | : 11,320,914 B1 | Page 1 of 1 |
| APPLICATION NO. | : 17/136794 | |
| DATED | : May 3, 2022 | |
| INVENTOR(S) | : Jiacheng Ni et al. | |

It is certified that error appears in the above-identified patent and that said Letters Patent is hereby corrected as shown below:

In the Claims

Claim 5, Column 12, Line 36, please delete "at least one special symbol being are" and insert therefor --at least one special symbol are--

Signed and Sealed this
Fourteenth Day of June, 2022

Katherine Kelly Vidal
*Director of the United States Patent and Trademark Office*